US008959493B2

United States Patent
Harman et al.

(10) Patent No.: US 8,959,493 B2
(45) Date of Patent: Feb. 17, 2015

(54) USING RANGE VALIDATION IN ASSEMBLY LANGUAGE PROGRAMMING

(75) Inventors: David J. Harman, Southampton (GB); Brian Johnson, Romsey (GB); David Knibb, Winchester (GB); Andrew Wright, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 13/169,954

(22) Filed: Jun. 27, 2011

(65) Prior Publication Data

US 2012/0331446 A1    Dec. 27, 2012

(51) Int. Cl.
*G06F 9/45* (2006.01)

(52) U.S. Cl.
CPC .............. *G06F 8/436* (2013.01); *G06F 8/441* (2013.01)
USPC ........................... 717/143; 717/136; 717/140

(58) Field of Classification Search
CPC .............. G06F 8/40; G06F 8/41; G06F 8/436
See application file for complete search history.

(56) References Cited

U.S. PATENT DOCUMENTS

| | | | |
|---|---|---|---|
| 5,132,972 A | 7/1992 | Hansen | |
| 5,339,238 A | 8/1994 | Benson | |
| 5,450,555 A | 9/1995 | Brown, III et al. | |
| 5,488,714 A * | 1/1996 | Skidmore | 717/143 |
| 5,613,121 A * | 3/1997 | Blainey | 717/151 |
| 5,644,769 A | 7/1997 | Hasiguti | |
| 5,784,552 A | 7/1998 | Bishop et al. | |
| 5,832,273 A * | 11/1998 | Mizuse | 717/143 |
| 5,963,742 A * | 10/1999 | Williams | 717/143 |
| 7,694,286 B2 * | 4/2010 | Dravnieks et al. | 717/143 |
| 7,836,436 B2 * | 11/2010 | Ringseth et al. | 717/136 |
| 7,971,195 B2 * | 6/2011 | Ringseth et al. | 717/136 |
| 8,555,260 B1 * | 10/2013 | Kizhepat et al. | 717/143 |
| 2004/0154006 A1 * | 8/2004 | Heishi et al. | 717/140 |
| 2005/0289523 A1 * | 12/2005 | Spektor et al. | 717/140 |
| 2006/0179424 A1 * | 8/2006 | Dravnieks et al. | 717/136 |
| 2008/0072216 A1 * | 3/2008 | Zhao et al. | 717/143 |
| 2009/0300589 A1 * | 12/2009 | Watters et al. | 717/140 |

(Continued)

OTHER PUBLICATIONS

Dalia A. El-Dib and Mohamed I. Elmasry; Modified Register-Exchange Viterbi Decoder for Low-Power Wireless Communications; IEEE; Feb. 2004; retrieved online on Sep. 27, 2014; pp. 371-378; Retrieved from the Internet: <URL: http://ieeexplore.ieee.org/stamp/stamp.jsp?tp=&arnumber=1266837>.*

(Continued)

*Primary Examiner* — Thuy Dao
*Assistant Examiner* — Hanh T Bui
(74) *Attorney, Agent, or Firm* — Steven M. Greenberg, Esq.; CRGO Law

(57) ABSTRACT

Embodiments of the present invention provide a method, system and computer program product for USING range validation during assembly of an assembly language program. In an embodiment of the invention, a method for USING range validation during assembly of an assembly language program has been provided. The method can include parsing assembler language source code loaded for assembly in an assembler executing in memory of a computer. The method also can include identifying a USING statement in the source code establishing a base address as the content of a register. Finally, in response to additionally identifying a subsequent statement in the source code that modifies the content of the register, a warning of an invalid USING range can be generated.

6 Claims, 1 Drawing Sheet

(56) References Cited

U.S. PATENT DOCUMENTS

2013/0283248 A1* 10/2013 Abadi et al. .................. 717/136
2014/0068570 A1* 3/2014 Cox et al. ..................... 717/136
2014/0189659 A1* 7/2014 Cooray et al. ................ 717/136

OTHER PUBLICATIONS

Matt Poole and Christopher Whyley; Compilers; 2002; retrieved online on Sep. 27, 2014; pp. 1-100; Retrieved from the Internet: <URL: http://www.win.tue.nl/~mydbrand/courses/GLT/0910/papers/notes.pdf>.*

Cristina Cifuentes et al.; Experience in the Design, Implementation and Use of a Retargetable Static Binary Translation Framework; Sun Microsystems; Jan. 2002; retrieved online on Sep. 27, 2014; pp. 1-59; Retrieved from the Internet: <URL: http://delivery.acm.org/10.1145/1700000/1698151/smli_tr-2002-105.pdf?>.*

Using Statement, http://msdn.microsoft.com/en-us/library/y17w47af (VS.80).aspx.2005.

Cole, David, "Using Usings What the Huh????" Aug. 2005.

* cited by examiner

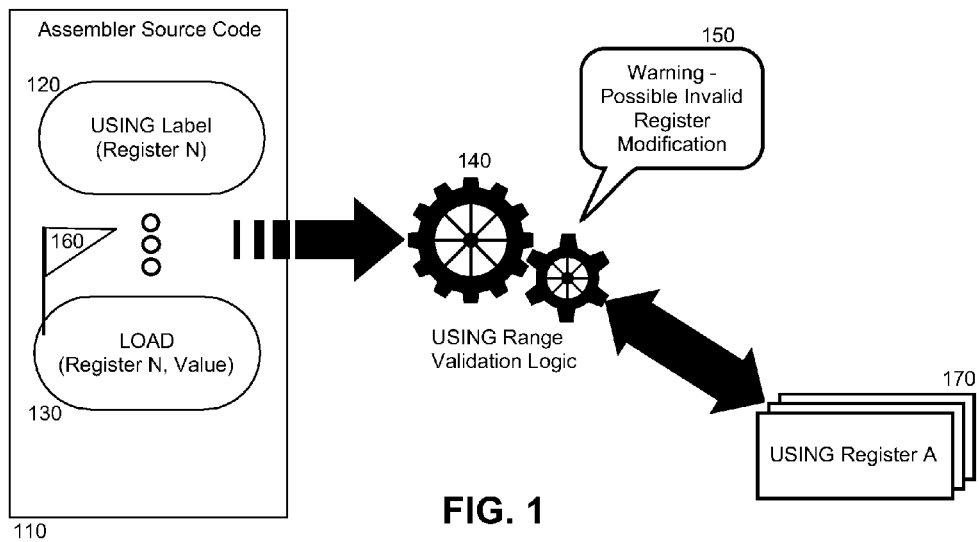
FIG. 1
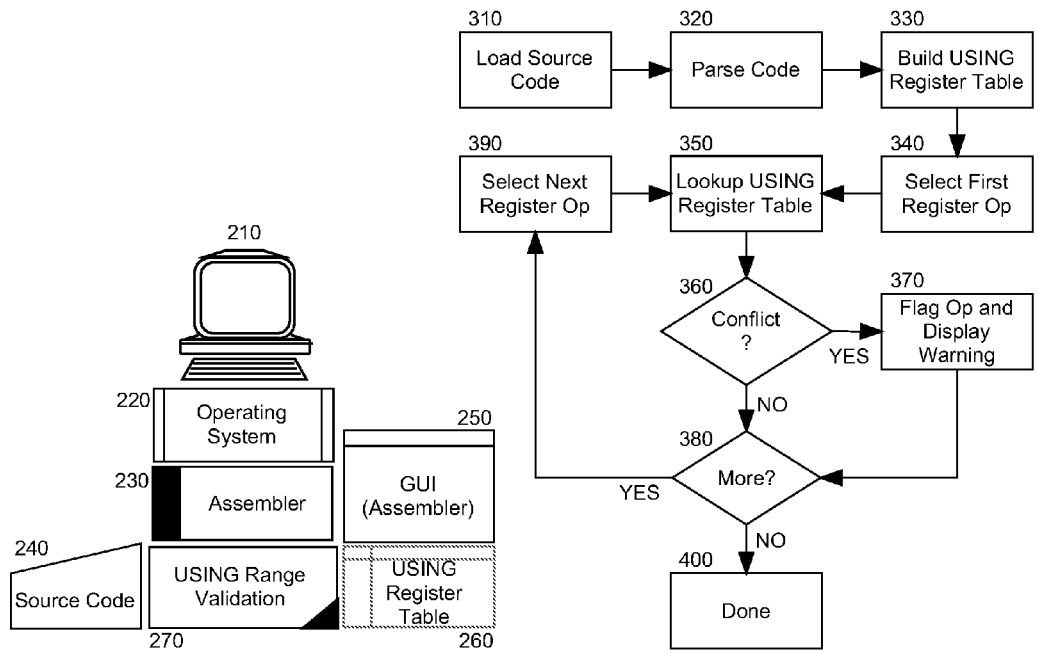
FIG. 2  FIG. 3

USING RANGE VALIDATION IN ASSEMBLY LANGUAGE PROGRAMMING

BACKGROUND OF THE INVENTION

1. Field of the Invention

The present invention relates to the field of assembly language programming and more particularly to USING range utilization in an assembly language program.

2. Description of the Related Art

Assembler language is a symbolic programming language that can be used to code instructions instead of coding in machine language. The Assembler language is the symbolic programming language that is closest to the machine language in form and content, and therefore is an excellent candidate for writing programs in which control of a program, down to the byte or bit level, is desired, or for writing subroutines for functions that are not provided by other symbolic programming languages, such as COBOL, FORTRAN, or PL/I.

Assembler language includes statements that represent either instructions or comments. The instruction statements are the working part of the language, and are divided into the following three groups: (1) machine instructions which are the symbolic representations of machine language instructions of instruction sets, (2) assembler instructions are requests to the assembler to perform certain operations during the assembly of a source module; for example, defining data constants, reserving storage areas, and defining the end of the source module, and (3) macro instructions or macros are requests to the assembler program to process a predefined sequence of instructions from which the assembler generates machine and assembler instructions, which then can be processed as if part of the original input in the source module.

Part of the power of assembler language programming is the ability to tightly control placement of data in specific areas of memory. In this regard, the USING assembler statement directs the assembler to map a particular data structure to a register that addresses the beginning of the structure. More specifically, the USING statement specifies a base address and range and assigns one or more base registers. Registers, in turn, can be loaded with virtual storage addresses that map to a place within an address space where the structure resides. Consequently, loading the base register with the base address establishes addressability in a control section.

Of note, the use of the USING statement is not without risk. Specifically, a problem arises when a USING statement in source code maps a base register to an area of storage, but the register subsequently is changed to contain a different address (or hold a value that is not an address) before the register can be used when fields in the structure are referenced by later instructions. In this instance, though it may be valid to change the contents of a register that has been previously identified to the assembler as a base register, more often than not, the change of the content of the register is the result of an inadvertent modification within the assembler code. Typically, the inadvertent modification of registers previously identified as base registers occurs within large sections of software that have grown complicated by many years of development and support modifications. Such problems often result in an abnormal end of task, also known as an "abend", either when the register is referenced for the purposes of resolving the field in the structure, or at a later point in the execution of the program.

Problems such as this can take time and effort to diagnose, especially if the inadvertent modification of a register mapped in a USING statement results in run-time errors that do not present themselves as straightforward program checks. An incorrect flow of control in program execution can result and the error may not present itself for some time (if at all). Such problems are known to be the hardest to resolve since there is considerable reverse analysis required to step back through the program instructions and determine where the problem presented itself. In turn, the cost in terms of development and service time and expense can be considerable.

BRIEF SUMMARY OF THE INVENTION

Embodiments of the present invention address deficiencies of the art in respect to the processing of a USING statement during assembly of an assembly language program and provide a novel and non-obvious method, system and computer program product for USING range validation during assembly of an assembly language program. In an embodiment of the invention, a method for USING range validation during assembly of an assembly language program has been provided. The method can include parsing assembler language source code loaded for assembly in an assembler executing in memory of a computer. The method also can include identifying a USING statement in the source code establishing a base address as the content of a register. Finally, the method can include responding to additionally identifying a subsequent statement in the source code modifying the content of the register, by generating a warning of an invalid USING range.

In one aspect of the embodiment, the method further can include determining that the subsequent statement modifies the content of the register to a value not consistent with an address and including in the warning text that the register had been the subject of a USING statement and has been directed to hold a value that is not an address. In another aspect of the embodiment, the method further can include determining that the subsequent statement modifies the content of the register to a value consistent with an address but an address that differs from the base address and including in the warning text that the register had been the subject of a USING statement and has been directed to hold a value that is a different address than that specified by the USING statement.

In another embodiment of the invention, an assembly language data processing system can be provided. The system can include a host computer with at least one processor and memory and an assembler executing in the memory of the host computer. Of note, a USING range validation module can be coupled to the assembler. The module can include program code executing in the memory of the host computer to identify in source code loaded for processing in the assembler a USING statement that establishes a base address as the content of a register, and to respond to an additional identification of a subsequent statement in the source code modifying the content of the register, by generating a warning of an invalid USING range.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for USING range validation during assembly of an assembly language program;

FIG. 2 is a schematic illustration of an assembly language data processing system configured for USING range validation during assembly of an assembly language program; and, FIG. 3 is a flow chart illustrating a process for USING range validation during assembly of an assembly language program.

DETAILED DESCRIPTION OF THE INVENTION

Embodiments of the invention provide for USING range validation during assembly of an assembly language program. In accordance with an embodiment of the invention, assembler language source code can be loaded into an assembler and the lines of assembly language statements in the source code can be parsed. For each register reference in the parsed source code, it can be determined whether or not the register had been previously assigned as a base for a structure mapped by a USING statement. If so, a warning can be displayed in connection with the assembly of the source code indicating a potential invalid overwriting of the register.

In further illustration, FIG. 1 pictorially shows a process for USING range validation during assembly of an assembly language program. As shown in FIG. 1, assembler source code 110 can include a USING statement 120 specifying a base address for a particular register. The assembler source code 110 further can include a subsequent statement 130 modifying the content of the particular register. During assembly, USING range validation logic 140 can track each instance of USING statements 170 in the assembler source code 110. As such, the USING range validation logic 140 can determine when the content of the particular register specified by the USING statements 170 is subsequently modified by the subsequent statement 130. In response, the USING range validation logic 140 can issue a warning 150 of the potential invalidity of the range specified by the USING statement 120.

The process described in connection with FIG. 1 can be implemented in an assembly language data processing system. In yet further illustration, FIG. 2 schematically shows an assembly language data processing system configured for USING range validation during assembly of an assembly language program. The system can include a host computer 210 with at least one processor and memory supporting the execution of an operating system 220. The operating system 220 in turn can host the operation of an assembler 230 configured to process assembly language source code 240 into binary objects (not shown). Optionally, a GUI 250 for the assembler 230 can be provided through which directives for assembling the source code 240 can be received and through which progress information can be provided in respect to those directives.

Of note, a USING range validation module 270 can be coupled to the assembler 230. The USING range validation module 270 can include program code that when executed in the memory of the host computer 210, identifies different instances of USING statements in the source code 240 and notes the same in a USING register table in connection with registers affected by the USING statements. The program code of the USING range validation module 270 additionally can be enabled to identify statements in the source code 240 affecting the content of registers listed in the USING register table 260. Finally, the program code of the USING range validation module 270 can respond to the identification of a statement in the source code 240 affecting the content of registers listed in the USING register table 260 by posting a warning in the GUI 250.

In yet further illustration of the operation of the USING range validation module 270, FIG. 3 is a flow chart illustrating a process for USING range validation during assembly of an assembly language program. Beginning in block 310, assembly language source code can be loaded for assembly and the source code can be parsed in block 320 to identify different statements disposed in the source code. As such, in block 330, a table of different USING statements corresponding to different registers can be constructed based upon the parsing.

In block 340, a first operation specified in the source code that references a register can be selected for processing and in block 350, the register can be compared to registers listed in the table. In decision block 360, it can be determined whether or not the register is listed in the table indicating a potential conflict. If so, in block 370 the selected operation can be flagged as a potential conflict and a warning can be generated.

For example, to the extent that the selected operation modifies the content of the register to a value not consistent with an address, a warning can be generated that the register had been the subject of a USING statement and has been directed to hold a value that is not an address. As another example, to the extent that the selected operation modifies the content of the register to a value that is consistent with an address, but an address that differs from that set forth in the USING statement, a warning can be generated that the register had been the subject of a USING statement and has been directed to hold a different address than that specified by the USING statement.

Thereafter, in decision block if additional operations remain to be processed, in block 390 a next register operation specified in the source code that references a register can be selected for processing. When no further operations specified in the source code that references a register remain to be processed, the process can end in block 400.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A method for USING range validation during assembly of an assembly language program, the method comprising:
   parsing assembler language source code loaded for assembly in an assembler executing in memory of a computer;
   identifying a USING statement in the source code establishing a base address as the content of a register;
   responsive to additionally identifying a subsequent statement in the source code modifying the content of the register, generating a warning of an invalid USING range, determining that the subsequent statement modifies the content of the register to a value consistent with an address but an address that differs from the base address identified by the USING statement, and including in the warning text that the register had been the subject of a USING statement and has been directed to hold a value that is a different address than that specified by the USING statement.

2. The method of claim 1, further comprising:
identifying a different subsequent statement in the source code modifying the content of the register; and,
responding to the identification by generating a warning of an invalid USING range, determining that the different subsequent statement modifies the content of the register to a value not consistent with an address and,
including in the warning text that the register had been the subject of a USING statement and has been directed to hold a value that is not an address.

3. An assembly language data processing system comprising:
a host computer with at least one processor and memory;
an assembler executing in the memory of the host computer; and,
a USING range validation module coupled to the assembler, the module comprising program code executing in the memory of the host computer to identify in source code loaded for processing in the assembler a USING statement that establishes a base address as the content of a register, and to respond to an additional identification of a subsequent statement in the source code modifying the content of the register, by generating a warning of an invalid USING range, determining that the subsequent statement modifies the content of the register to a value consistent with an address but an address that differs from the base address identified by the USING statement, and including in the warning text that the register had been the subject of a USING statement and has been directed to hold a value that is a different address than that specified by the USING statement.

4. The system of claim 3, wherein the program code subsequently determines that the a different statement subsequently encountered directs a register that is the subject of a USING statement to hold a value that is not an address and in response, the program code generates an additional warning that comprises text that the register had been the subject of a USING statement and has been directed to hold a value that is not an address.

5. A computer program product for USING range validation during assembly of an assembly language program, the computer program product comprising:
a non-transitory computer readable storage medium comprising a storage device having computer readable program code embodied therewith, the computer readable program code comprising:
computer readable program code for parsing assembler language source code loaded for assembly in an assembler executing in memory of a computer;
computer readable program code for identifying a USING statement in the source code establishing a base address as the content of a register; and,
computer readable program code for responding to additionally identifying a subsequent statement in the source code modifying the content of the register, by generating a warning of an invalid USING range, determining that the subsequent statement modifies the content of the register to a value consistent with an address but an address that differs from the base address identified by the USING statement and including in the warning text that the register had been the subject of a USING statement and has been directed to hold a value that is a different address than that specified by the USING statement.

6. The computer program product of claim 5, further comprising:
computer readable program code for identifying a different subsequent statement in the source code modifying the content of the register;
computer readable program code for responding to the identification by generating a warning of an invalid USING range, determining that the different subsequent statement modifies the content of the register to a value not consistent with an address,
computer readable program code for including in the warning text that the register had been the subject of a USING statement and has been directed to hold a value that is not an address.

* * * * *